(12) United States Patent
Oliveira, Jr. et al.

(10) Patent No.: US 9,024,595 B1
(45) Date of Patent: May 5, 2015

(54) ASYMMETRIC TRANSIENT RESPONSE CONTROL

(71) Applicant: VLT, Inc., Sunnyvale, CA (US)

(72) Inventors: Eduardo M. A. Oliveira, Jr., Lowell, MA (US); Maurizio Salato, Burlington, MA (US)

(73) Assignee: VLT, Inc., Sunnyvale, CA (US)

( * ) Notice: Subject to any disclaimer, the term of this patent is extended or adjusted under 35 U.S.C. 154(b) by 239 days.

(21) Appl. No.: 13/830,317

(22) Filed: Mar. 14, 2013

(51) Int. Cl.
  *H02M 3/156* (2006.01)
  *G06G 7/14* (2006.01)
  *G05F 1/00* (2006.01)

(52) U.S. Cl.
  CPC ... *G06G 7/14* (2013.01); *G05F 1/00* (2013.01)

(58) Field of Classification Search
  USPC ............. 323/280, 281, 234, 282–285; 361/18
  See application file for complete search history.

(56) References Cited

U.S. PATENT DOCUMENTS

| | | | |
|---|---|---|---|
| 7,688,050 B2* | 3/2010 | Schiff et al. | 323/276 |
| 2002/0080631 A1* | 6/2002 | Kanouda et al. | 363/62 |
| 2014/0253075 A1* | 9/2014 | Tuten | 323/282 |

* cited by examiner

*Primary Examiner* — Matthew Nguyen
*Assistant Examiner* — Kyle J Moody
(74) *Attorney, Agent, or Firm* — Foley & Lardner LLP; John D. Lanza (57) ABSTRACT

A loop controller includes an error amplifier configured to receive an output of a controlled process and further configured to receive a reference input; and an asymmetric compensator. The asymmetric compensator includes a high pass filter configured to receive an amplified version of the reference input and output a filtered reference; and an asymmetric impedance configured to receive an amplified version of the filtered reference and output a compensation signal. The error amplifier is further configured to sum the compensation signal and the output of the controlled process, and provide an error signal based on a difference between the sum and the reference input. The compensation signal includes a first gain for a rising transition of the controlled process output and a second gain for a falling transition of the controlled process output.

40 Claims, 6 Drawing Sheets

ASYMMETRIC TRANSIENT RESPONSE CONTROL

SUMMARY

The inventors have perceived that in electronic systems, an output of the system may be changed from a low level to a high level or a high level to a low level by way of rapid transitions. For example, the output may transition between a logic high and logic low voltage, or between two power supply voltage levels. A transition may cause overshoot, undershoot, or ringing of the output before the output settles into a steady state at the new level.

In some systems, it would be desirable to minimize one or both of undershoot and overshoot, and may be further desirable to asymmetrically minimize both undershoot and overshoot. For example, the percent overshoot at a rising edge may be different than the percent undershoot at a falling edge, such that the rising and falling edges are asymmetric, and thus asymmetric compensation may be employed. For another example, it may be advantageous to compensate for undershoot at a falling edge while minimizing an effect on a rising edge, and thus asymmetric compensation may be employed.

In one embodiment of the present disclosure, a control loop includes asymmetric compensation for signal transitions. A loop controller includes an error amplifier configured to receive an output of a controlled process and further configured to receive a reference input; and an asymmetric compensator. The asymmetric compensator includes a high pass filter configured to receive an amplified version of the reference input and output a filtered reference; and an asymmetric impedance configured to receive an amplified version of the filtered reference and output a compensation signal. The error amplifier is further configured to sum the compensation signal and the output of the controlled process, and provide an error signal based on a difference between the sum and the reference input. The compensation signal includes a first gain for a rising transition of the controlled process output and a second gain for a falling transition of the controlled process output.

In one embodiment, the asymmetric compensation circuit is included in a server system, where the asymmetric compensation circuit provides feed-forward compensation of a power supply output such that the undershoot at a high-to-low transition of the output meets a requirement of a specification for a voltage setpoint transient.

DETAILED DESCRIPTION

This disclosure describes a system with closed-loop control including, e.g., feed-forward control, the gain of which is asymmetric over at least part of its frequency spectrum.

In one embodiment, compensation is provided into the control system asymmetrically such that the system is quick to respond to a decrease in voltage, but slow to respond to an increase. In another embodiment, a current feed-forward signal is asymmetric such that the system is quick to respond to an increase in current, but slow to respond to a decrease.

Compensation may be used, for example, to prevent or diminish undershoot at a falling voltage transition while minimizing impact to the slew rate for a rising voltage transition.

Asymmetric compensation may be implemented in systems where an asymmetric response to disturbances is desirable. For example, crossing a low-side threshold may not be allowed, but temporary crossing of a high-side threshold may be allowed. Asymmetric compensation may be implemented in systems to compensate for a system response that is asymmetric. For example, a system may not sink as much current as it sources, so that system response is asymmetric for voltage set-point transitions.

The asymmetric compensation may be implemented in a feedback or feed-forward mode.

In one embodiment, asymmetric compensation is included in a server system, where asymmetric feed-forward compensation is summed with a power supply output such that undershoot at a high-to-low transition of the output meets a requirement for a voltage setpoint transient.

Figure 1:
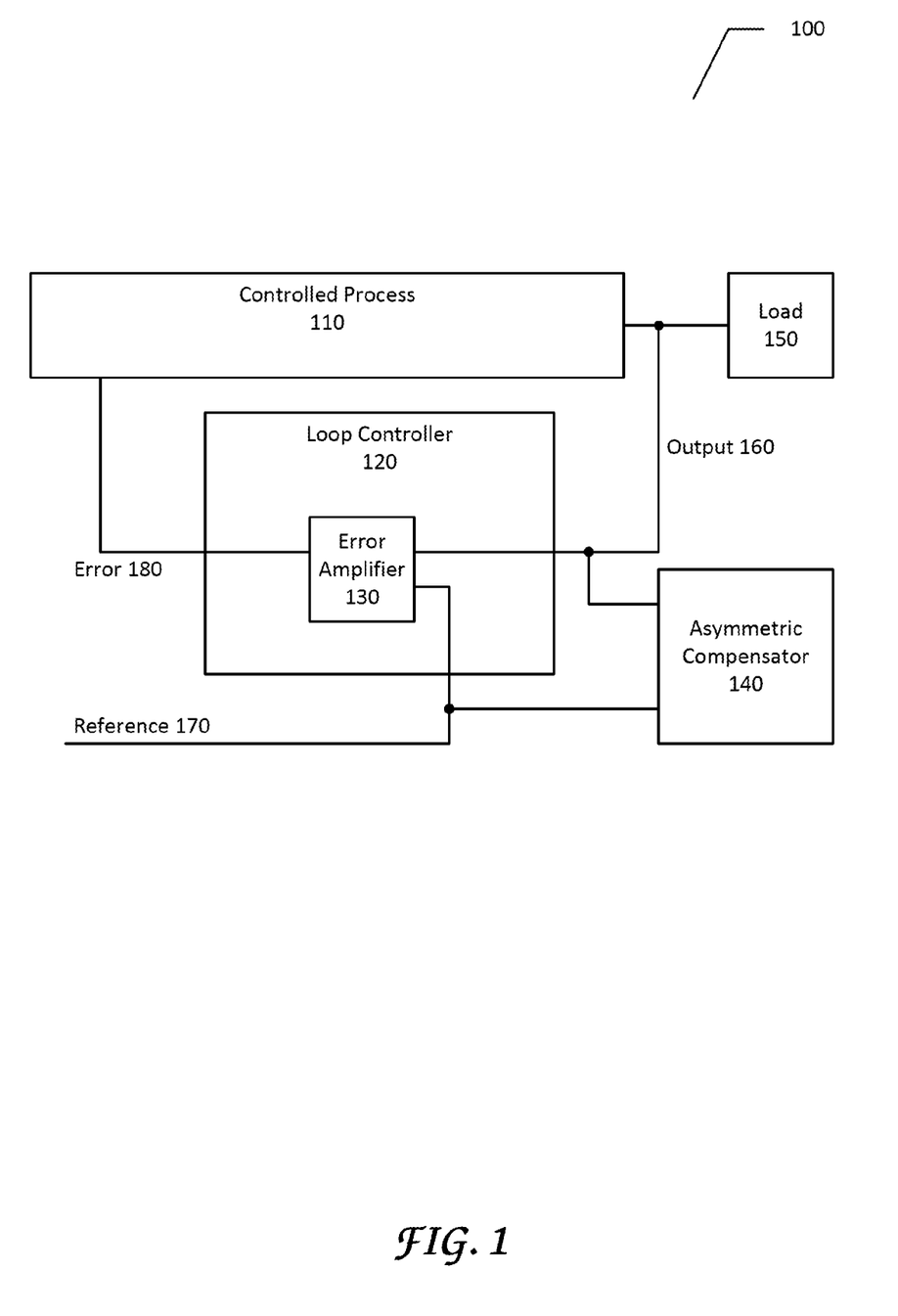
FIG. 1 conceptually illustrates an example of a control system.

FIG. 1 conceptually illustrates an example of a control system 100 including a controlled process 110, a loop controller 120 including an error amplifier 130, an asymmetric compensator 140, and a load 150. Control system 100 is illustrated at a block diagram level to introduce the terminology used in this disclosure, and the illustration is not limiting. Control system 100 may include more components, and may include multiple instances of components. For example, loop controller 120 may include multiple error amplifiers 130, and system 100 may include multiple loop controllers 120.

Controlled process 110 may be a multi-component process including hardware, software, firmware, or a combination of hardware, software and firmware components, that are controlled in a closed loop configuration to drive a load 150 with an output 160. The load 150 could be, for example, a microprocessor having variable input voltage requirements, and the output 160 might be a supply of power at a particular voltage. The closed loop may include feedback and/or feed-forward control. In some embodiments, output 160 is actually multiple outputs 160. In some embodiments, multiple control loops are included to control one or more outputs 160.

Loop controller 120 outputs control information to controlled process 110 for adjustment of controlled process 110, to maintain one or more parameters within a predefined range. An example of control information is an error signal.

Error amplifier 130 of loop controller 120 receives output 160 from controlled process 110, compares the output to a reference 170, and generates an error signal 180 based at least in part on the difference between output 160 and reference 170.

Asymmetric compensator 140 is connected between the inputs of error amplifier 130 to asymmetrically compensate output 160. For example, output 160 may exhibit undershoot upon being commanded to a lower voltage and overshoot upon being commanded to a higher voltage, where the undershoot is greater than the overshoot. For this example, asymmetric compensator 140 may asymmetrically dampen the undershoot and overshoot, so that the undershoot is dampened more than the overshoot, thereby making the output more symmetric. Asymmetric compensator 140 may be implemented as part of loop controller 120. Asymmetric compensator 140 may include a linear network and a non-linear network, or an active network, and may provide a first impedance for a perturbation of a first polarity and a second impedance for a perturbation of an opposite polarity. Asymmetric compensator 140 may provide different gain values according to the polarity of the perturbations.

Figure 2A:
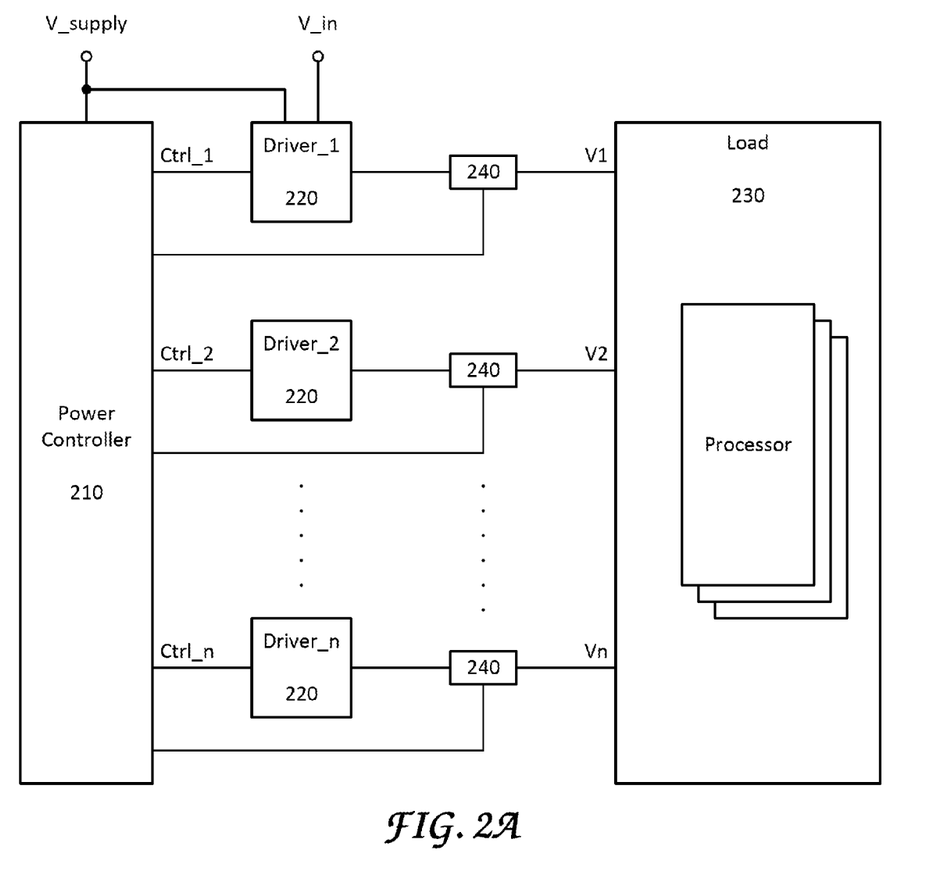
FIG. 2A conceptually illustrates an example of a power supply for a load.

FIG. 2A conceptually illustrates a controlled process by way of example, in which a power controller 210 provides control signals (e.g., Ctrl_1, Ctrl_2, and Ctrl_n) to one or more power drivers 220 (e.g., Driver_1, Driver_2, and Driver_n), which turn on when commanded to provide power to a load 230. Load 230 may include one or more processors as shown, and may further include other components such as memories, circuits, and integrated circuits. In some embodiments, multiple power inputs (e.g., V1, V2, and Vn) are tied together to provide a higher-current supply for load 230. Between drivers 220 and load 230 are sensors 240 for determining a characteristic of the power provided to load 230. Sensors 240 may be electrical connections, integrated circuits, or analog circuitry such as resistors, capacitors, and inductors. A characteristic of the power may be related to voltage or current at the sensor location.

Figure 2B:
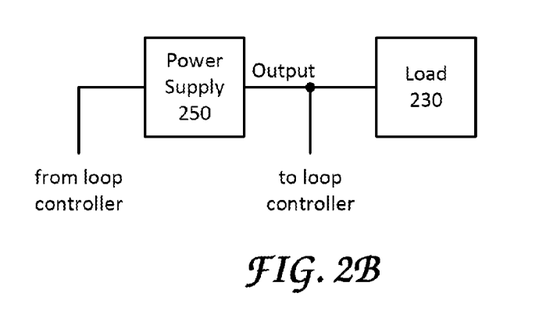
FIG. 2B conceptually illustrates the example of FIG. 2A as part of a control system.

FIG. 2B illustrates the controlled process of FIG. 2A at a higher block diagram level. At this level, power controller 210, drivers 220, and sensors 240 are illustrated as a power supply 250. Power supply 250 is a controlled process, which provides one or more outputs (i.e., one or more of V1, V2, and Vn) to a load (i.e., load 230). An output is also provided to a loop controller, and control information is received by power supply 250 from the loop controller.

Figure 3:
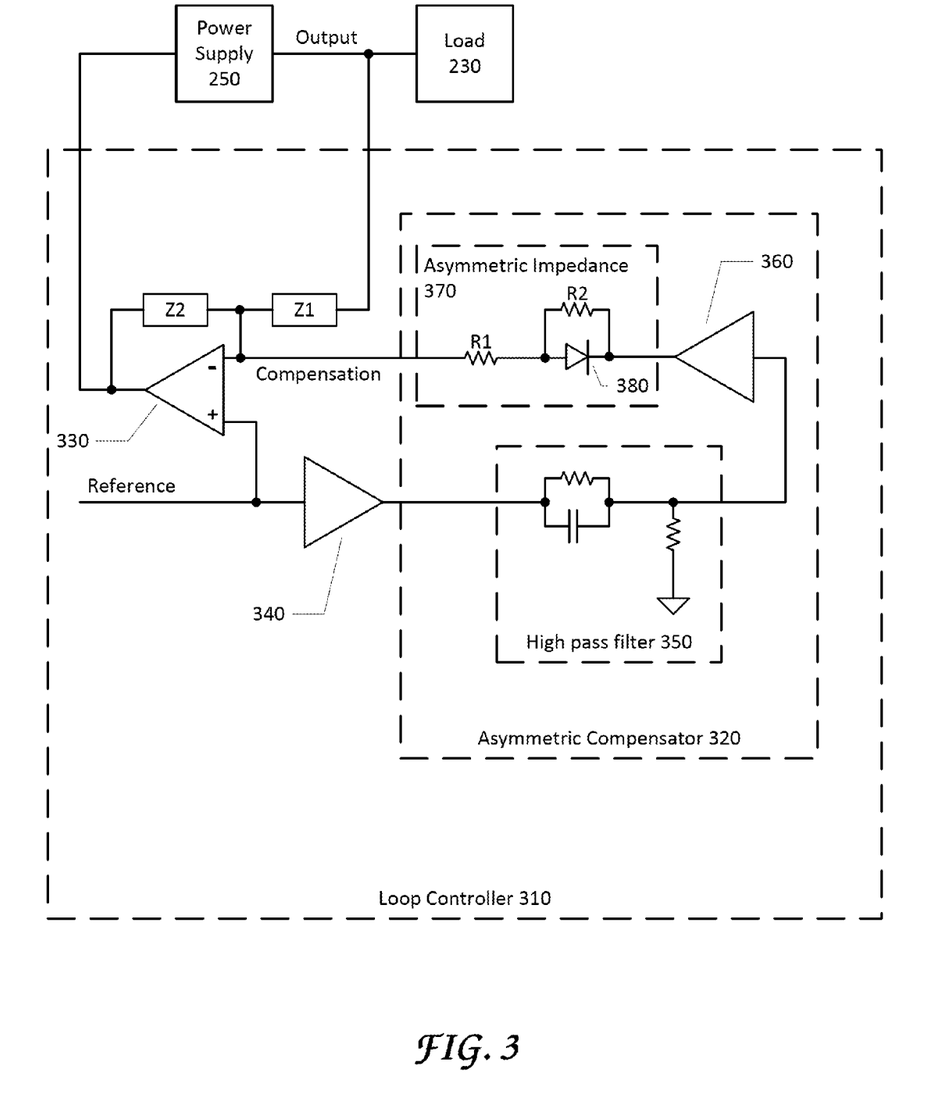
FIG. 3 conceptually illustrates an example of a power supply control system.

FIG. 3 conceptually illustrates power supply 250 of FIG. 2B providing an output or outputs to a load (i.e., load 230). An output from power supply 250 is also provided to a loop controller 310, which in this embodiment is illustrated as including asymmetric compensator 320.

Loop controller 310 further includes an error amplifier 330 with input and feedback impedances Z1 and Z2, respectively. The output of power supply 250 is provided to error amplifier 330 through input impedance Z1 at the negative terminal. A reference is provided to error amplifier 330 at the positive terminal. The reference is also provided through an amplifier 340, a high pass filter 350, a buffer 360, and an asymmetric impedance 370 to the negative terminal of error amplifier 330.

The reference may vary, causing the output of error amplifier 330 to change in magnitude, which in turn causes power supply 250's output to change in magnitude. If the reference increases, power supply 250's output increases, and if the reference decreases, power supply 250's output decreases. The system may take some time to settle to a substantially steady state after the reference changes. Depending upon the system characteristics, power supply 250's output may overshoot or undershoot the reference, and may oscillate for a time after switching. For example, following an increase in the reference, power supply 250's output may increase to a level greater than the reference (i.e., overshoot) and then decrease to a substantially steady state. For another example, following a decrease in the reference, power supply 250's output may decrease to less than the reference (i.e., undershoot) and then increase to a substantially steady state. In some embodiments, the response of the system is asymmetric, such that an overshoot and an undershoot exist but are not symmetric. Asymmetric compensator 320 provides compensation for such asymmetry.

Asymmetric impedance 370 of asymmetric compensator 320 includes a precision diode 380, or other unidirectional conduction device, in a normally reverse-biased mode.

Asymmetric impedance 370 is illustrated as including resistive components R1 and R2. Other embodiments use reactive components such as capacitors and/or inductors. Yet other embodiments use a combination of resistive and reactive components.

In some embodiments, amplifier 340, high pass filter 350, and buffer 360 together have a DC voltage gain of one (1), such that no compensation current is injected under static conditions. In some embodiments, amplifier 340, high pass filter 350, and buffer 360 together have a gain greater than one (1) at higher frequencies, such that when the reference changes, a voltage difference appears between the terminals of error amplifier 330 for a duration determined by the time constant of high pass filter 350.

The circuitry between the reference and the output of buffer 360 (e.g., amplifier 340, high pass filter 350, and buffer 360) has an overall transfer function H(f). The voltage developed across asymmetric impedance 370 is $V_{reference}(H(f)-1)$, to induce a compensation current to flow through asymmetric impedance 370, thereby causing a compensating voltage drop across impedance Z1. The magnitude of this compensation current is $V_{reference}(H(f)-1)/(R1+R2)$ in the case where diode 380 is reverse-biased, and $V_{reference}(H(f)-1)/R1$ in the case where diode 380 is forward-biased. Thus, asymmetric compensation is introduced for signal transitions.

Figure 4:
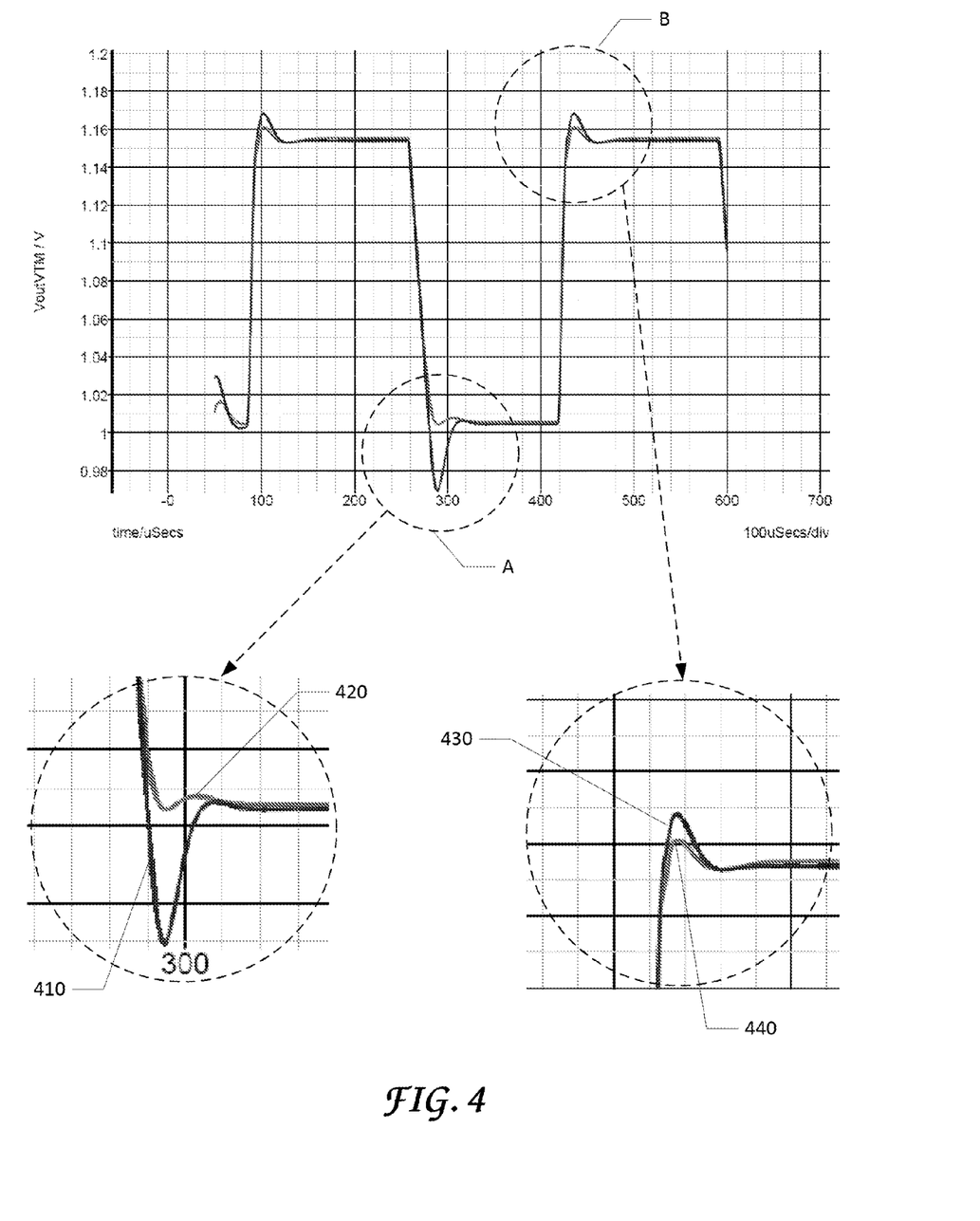
FIG. 4 conceptually illustrates signal transitions at an output.

FIG. 4 conceptually illustrates the difference that the addition of an asymmetric compensator made in the output of one simulated power supply system similar to the system illustrated in FIG. 3. In FIG. 4, an output of the power supply is plotted on a graph of time versus voltage. In the simulation, a square wave with non-zero rise and fall times was input as the reference, and the power supply correspondingly switched the output between voltage levels. The graph illustrates the power supply output with and without an asymmetric compensator. In the breakout labeled A, trace 410 represents the power supply output without asymmetric compensation. As can be seen in breakout A, trace 410 significantly undershoots at a falling edge before settling into a stable state. Also in breakout A, trace 420 represents the power supply output with asymmetric compensation. It can be seen that the compensation substantially reduces or eliminates the undershoot.

In the breakout of FIG. 4 labeled B, trace 430 represents the power supply output at a rising edge without asymmetric compensation, and trace 440 represents the power supply output at the rising edge with asymmetric compensation. It can be seen that the compensation reduces the overshoot.

Comparing breakouts A and B, the asymmetry of the overshoot and undershoot without compensation is apparent, as seen in traces 410 and 430, respectively. Further, a comparison of the difference between trace 420 and 410 with the difference between trace 440 and 430 shows that compensation is also asymmetrical, such that more compensation is applied to eliminate undershoot than is applied to limit overshoot. Thus, asymmetrical compensation is used to compensate for asymmetrical system responses. In other embodiments, asymmetrical compensation may be used to augment an existing asymmetry, and in yet other embodiments, asymmetrical compensation may be used to introduce asymmetry into a substantially symmetric system response.

Referring back to FIG. 3, resistors R1 and R2 of asymmetric impedance 370 are used to set the asymmetric gain of the compensation for the rising and falling edges. The components of high pass filter 350 are selected according to the desired filter characteristics. For example, the cutoff frequency may be selected to select the duration of a compensation transient.

Placing precision diode 380 in an opposite position such that the cathode faces away from buffer 360 configures the asymmetry of asymmetric compensator 320 to be reversed, such that the rising edge transition is more damped than the falling edge transition.

Figure 5:
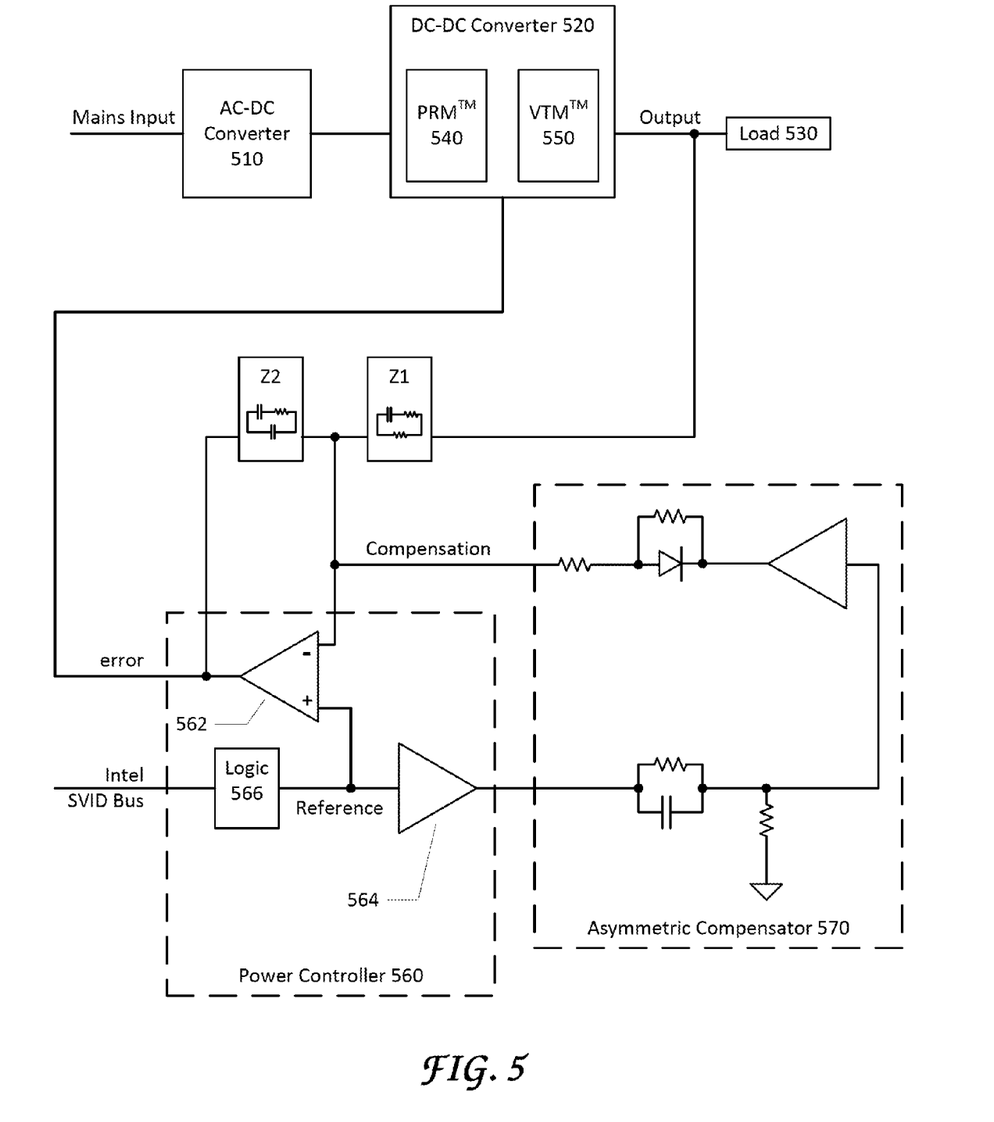
FIG. 5 conceptually illustrates an example of a power supply control system.

FIG. 5 conceptually illustrates an example of a controlled power supply system, in which an alternating-current to direct-current (AC-DC) converter 510 receives AC mains input power and converts it to DC, and a DC-DC converter 520 regulates power to a load 530. The power supply component combination of AC-DC converter 510 and DC-DC converter 520 is illustrated by way of example only and is not limiting. In other embodiments, depending upon the mains input of the system, there may be different power supply components. For example, a mains input may be AC or DC, and may be a high power, low power, or any other power source. Correspondingly, power supply components may include any one or more of AC-DC, DC-DC, and DC-AC converters or regulators, and any combination of buck, boost, or buck-boost converters. In the example of FIG. 5, DC-DC converter 520 includes a PRM™ regulator component 540 and a VTM™ current multiplier component 550, both available from VI Chip Corp., 25 Frontage Rd. Andover, Mass. 01810.

The output of DC-DC converter 520 is provided to a power controller 560 through an impedance Z1. Power controller 560 may be similar to a Dynamic Voltage Control (DVC) feed-forward controller such as the Intersil ISL6366 or ISL6367 VR12.x controllers. A power change command is received by power controller 560 over an Intel SVID Bus, and converted to a corresponding reference voltage level in logic block 566. The SVID Bus is included by way of illustration but is not limiting. Other command inputs may alternatively be used. Error amplifier 562 outputs an error signal based on the difference between the reference and the output of DC-DC converter 520. Thus, when a higher or lower voltage level is commanded over the SVID Bus, DC-DC converter 520 responds to the resulting error signal from error amplifier 562 by correspondingly adjusting its output level. Asymmetric compensator 570 is connected to power controller 560, and functions as described previously to asymmetrically compensate for undershoot and overshoot. Amplifier 564 of power controller 560 provides for static or variable gain of the reference.

Figure 6:
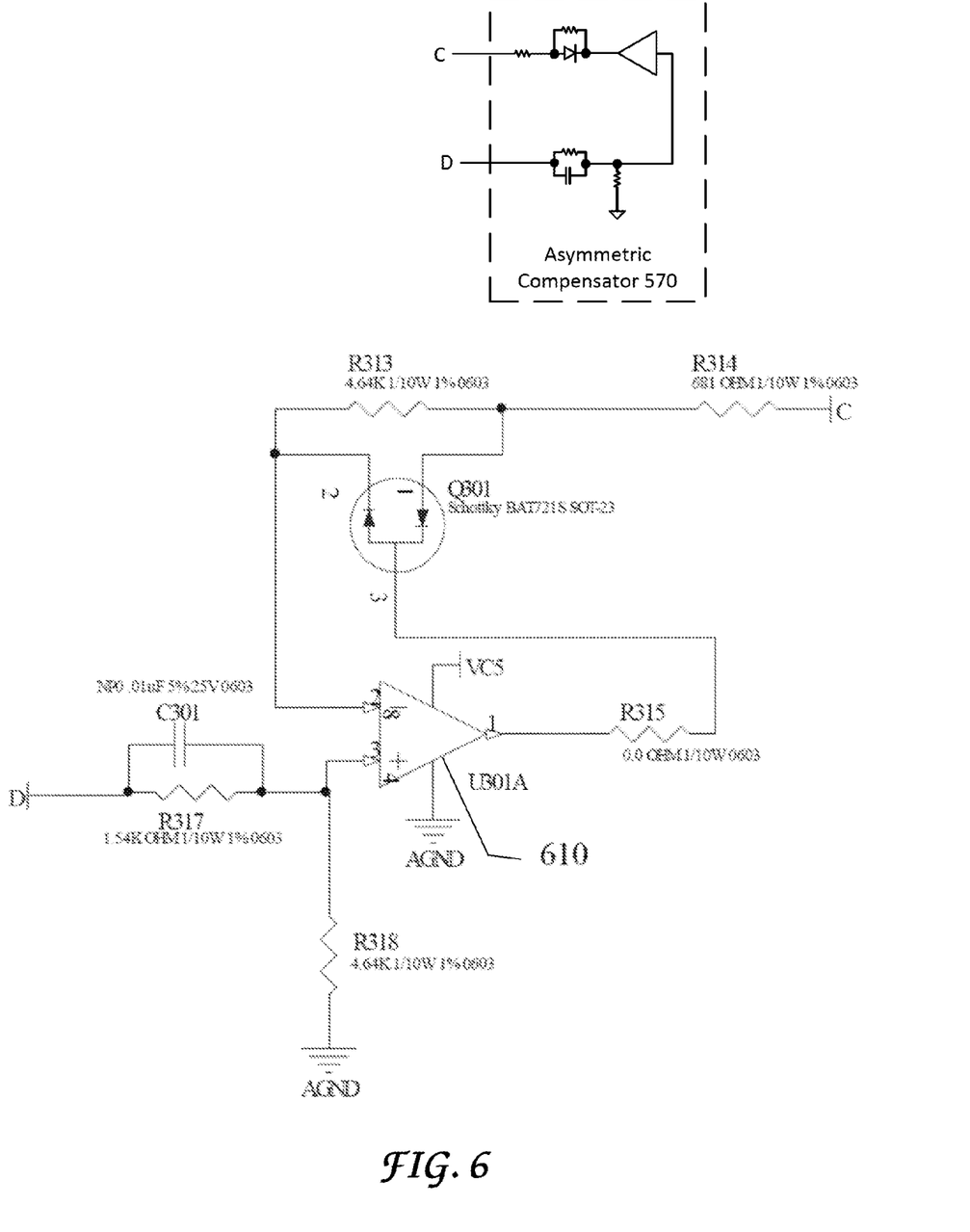
FIG. 6 illustrates a schematic for an example asymmetric compensator.

FIG. 6 conceptually illustrates an example of a schematic for asymmetric compensator 570 used with an error amplifier 610 (similar to error amplifier 562 of FIG. 5). The illustration of asymmetric compensator 570 from FIG. 5 is included at the top of FIG. 6 for reference, with connections C and D marked. Corresponding connections C and D are marked on the schematic.

It will be appreciated that a variety of circuit topologies may be configured to provide the desired asymmetric response. For example, the compensation circuit may be implemented using active or passive networks, it may be connected to one or two inputs of the error amplifier, the output of the error amplifier, or the inputs and output of the error amplifier. Additionally, all or part of the loop controller, such as the compensation circuit or the error amplifier or both, may be implemented digitally, e.g. in a digital controller or digital signal processor. Thus is described asymmetric compensation introduced into a closed-loop control system for compensation of transition behavior.

The invention claimed is:

1. A loop controller, comprising:
   an error amplifier configured to receive an output of a controlled process and further configured to receive a reference input; and
   an asymmetric compensator, including:
   a high pass filter configured to receive an amplified version of the reference input and output a filtered reference; and
   an asymmetric impedance configured to receive an amplified version of the filtered reference and output a compensation signal;
   wherein the error amplifier is further configured to sum the compensation signal and the output of the controlled process, and provide an error signal based on a difference between the sum and the reference input, and wherein the compensation signal includes a first gain for a rising transition of the controlled process output and a second gain for a falling transition of the controlled process output.

2. The loop controller of claim 1, wherein second gain is greater than the first gain.

3. The loop controller of claim 1, wherein first gain is greater than the second gain.

4. The loop controller of claim 1, wherein the second gain compensates for an undershoot of the falling transition.

5. The loop controller of claim 1, wherein the first gain and the second gain are asymmetric to compensate an asymmetry of the controlled process output.

6. The loop controller of claim 1, wherein the first gain and the second gain are asymmetric to introduce an asymmetry to the controlled process output.

7. The loop controller of claim 1, wherein the controlled process output is an output of a power supply.

8. The loop controller of claim 1, wherein the high pass filter is further configured such that when the reference input changes, a voltage difference appears between terminals of the error amplifier for a duration determined by a time constant of the high pass filter.

9. The loop controller of claim 1, wherein the asymmetric impedance includes a precision diode circuit.

10. The loop controller of claim 1, wherein the compensation signal is part of a feed-forward control loop.

11. The loop controller of claim 1, wherein the compensation signal is part of a feedback control loop.

12. The loop controller of claim 1, wherein the asymmetric impedance includes at least one of a resistive component and a reactive component.

13. The loop controller of claim 12, wherein the asymmetric impedance includes a combination of resistive and reactive components.

14. A power supply, comprising:
    a regulator;
    an error amplifier configured to receive an output of the regulator and further configured to receive a reference input; and
    an asymmetric compensator, including:
    a high pass filter configured to receive an amplified version of the reference input and output a filtered reference; and
    an asymmetric impedance configured to receive an amplified version of the filtered reference and output a compensation signal;
    wherein the error amplifier is further configured to sum the compensation signal and the regulator output, and provide an error signal based on a difference between the sum and the reference input, and wherein the compensation signal is part of a feed-forward control loop.

15. The power supply of claim 14, wherein the asymmetric impedance imparts an asymmetric gain component to the compensation signal.

16. The power supply of claim 15, wherein the asymmetric gain component includes a first gain for a rising transition of the regulator output and a second gain for a falling transition of the regulator output.

17. The power supply of claim 16, wherein second gain is greater than the first gain.

18. The power supply of claim 16, wherein first gain is greater than the second gain.

19. The power supply of claim 16, wherein the second gain compensates for an undershoot of the falling transition.

20. The power supply of claim 16, wherein the second gain compensates for an overshoot of the rising transition.

21. The power supply of claim 16, wherein the first gain and the second gain are asymmetric to compensate an asymmetry of the regulator output.

22. The power supply of claim 16, wherein the first gain and the second gain are asymmetric to introduce an asymmetry to the regulator output.

23. The power supply of claim 14, wherein the high pass filter is further configured such that when the reference input changes, a voltage difference appears between terminals of the error amplifier for a duration determined by a time constant of the high pass filter.

24. The power supply of claim 14, wherein the asymmetric impedance includes a precision diode circuit.

25. The power supply of claim 14, configured to provide a variable voltage output to an integrated circuit.

26. An apparatus comprising:
a closed loop control system including a controlled process for delivering a controlled process output and a loop controller including an error amplifier and a compensation circuit;
the loop controller being adapted to receive a reference input and a representation of the controlled process output and to produce an error signal for controlling the controlled process;
wherein the loop controller provides a first response characteristic for a perturbation of a first polarity and a second response characteristic for a perturbation of an opposite polarity, the first response characteristic being different than the second response characteristic.

27. The apparatus of claim 26, wherein the compensation circuit further includes an active network to provide a first gain for the perturbation of the first polarity and a second gain for the perturbation of the opposite polarity.

28. The apparatus of claim 26, wherein the compensation circuit further includes a linear network and a non-linear network to provide a first impedance for the perturbation of the first polarity and a second impedance for the perturbation of the opposite polarity.

29. The apparatus of claim 28, wherein the linear network comprises a high pass filter configured to receive an amplified version of the reference input and output a filtered reference.

30. The apparatus of claim 28, wherein the non-linear network comprises a precision rectifier circuit.

31. The apparatus of claim 28, wherein the linear network comprises a high pass filter and the non-linear network comprises a unidirectional conduction device.

32. The apparatus of claim 26, wherein the compensation circuit is connected to an input of the error amplifier.

33. The apparatus of claim 26, wherein the compensation circuit is connected to an output of the error amplifier.

34. The apparatus of claim 26, wherein the compensation circuit is connected to an input of the error amplifier and an output of the error amplifier.

35. The apparatus of claim 26, wherein the error amplifier includes two inputs and the compensation circuit is connected to both inputs of the error amplifier.

36. The apparatus of claim 26, wherein the compensation circuit provides a first gain for DC signals and a second higher gain for higher frequency signals.

37. The apparatus of claim 26, wherein the error amplifier is further configured to sum a compensation signal from the compensation circuit and the controlled process output, and provide the error signal based on a difference between the sum and the reference input, and wherein the compensation signal includes a first gain for a rising transition of the controlled process output and a second gain for a falling transition of the controlled process output.

38. The apparatus of claim 26, wherein the controlled process is a power supply and the controlled process output is an output of the power supply.

39. The apparatus of claim 26, wherein the compensation circuit is implemented in a digital controller to provide a first gain for the perturbation of the first polarity and a second gain for the perturbation of the opposite polarity.

40. The apparatus of claim 26, wherein the loop controller is implemented in a digital controller.

\* \* \* \* \*